(12) United States Patent
Yoshida

(10) Patent No.: US 7,701,182 B2
(45) Date of Patent: Apr. 20, 2010

(54) DC-DC CONVERTER

(75) Inventor: Teiji Yoshida, Tokyo (JP)

(73) Assignee: NEC Toshiba Space Systems, Ltd., Tokyo (JP)

( * ) Notice: Subject to any disclaimer, the term of this patent is extended or adjusted under 35 U.S.C. 154(b) by 111 days.

(21) Appl. No.: 12/163,573

(22) Filed: Jun. 27, 2008

(65) Prior Publication Data
US 2009/0001955 A1    Jan. 1, 2009

(30) Foreign Application Priority Data
Jun. 29, 2007 (JP) .............................. 2007-171688

(51) Int. Cl.
*G05F 1/00* (2006.01)
(52) U.S. Cl. ........................ 323/272; 323/906
(58) Field of Classification Search ................ 323/906, 323/272
See application file for complete search history.

(56) References Cited

U.S. PATENT DOCUMENTS

| 4,257,087 A | 3/1981 | Cuk |
| 6,304,065 B1 | 10/2001 | Wittenbreder |
| 6,437,999 B1 | 8/2002 | Wittenbreder |
| 7,183,754 B2 * | 2/2007 | Tsuruya ...................... 323/272 |

FOREIGN PATENT DOCUMENTS

JP    04364358 A    12/1992

OTHER PUBLICATIONS

European Search Report for EP 08 25 2183 completed Oct. 31, 2008.

* cited by examiner

*Primary Examiner*—Shawn Riley

(57) ABSTRACT

Disclosed is a low noise, non-isolated DC-DC converter for providing a non-inverted (i.e., the same polarity as an input voltage) output voltage of any desired voltage by stepping-up/down the input voltage. It comprises an input coil L1, an input capacitor C1 and a second intermediate coil Lm2 connected in series between both ends of the input voltage source, an output coil L2, an output capacitor C2 and a first intermediate coil Lm1 connected in series between both ends of a load Ro, a switching device S connected between a node a of the L1 and the C1 and a node b of the C2 and the Lm1, and a diode D connected between a node d of the C1 and the Lm2 and a node c of the C2 and the L2.

10 Claims, 16 Drawing Sheets

$V_i \, min \leq V_o \leq V_i \, max$
$V_o = V_i \times D/(1-D)$

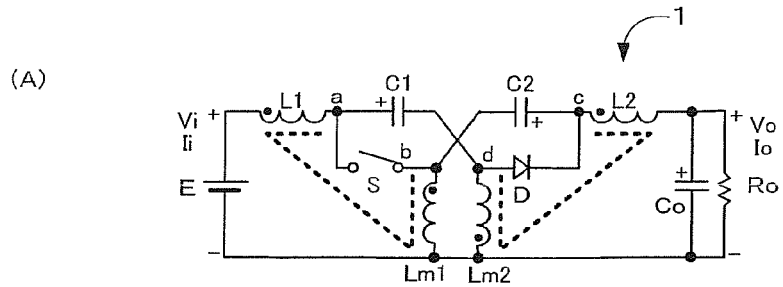

(B)

Transfer function   $V_o = V_i * D/(1-D)$ (step-up/down, same polarity of input/output voltages)
$V_i = V_o * (1-D)/D$
$D = V_o/(V_i + V_o)$ (C)

Ripple currents under conditions below
$L1 = L2 = L$
$Lm1 = Lm2 = Lm$

| L1 | Lm1 | L2 | Lm2 | |
|---|---|---|---|---|
| 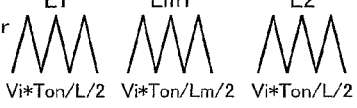 | | | | @ No coupling between L1 and Lm1<br>No coupling between L2 and Lm2 |
| $V_i*T_{on}/L/2$ | $V_i*T_{on}/Lm/2$ | $V_i*T_{on}/L/2$ | $V_i*T_{on}/Lm/2$ | | or 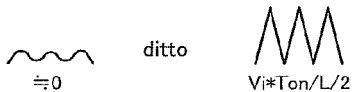 ditto 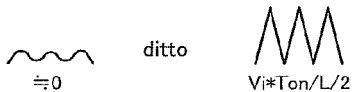 ditto   @ Coupling between L1 and Lm1: $k11=n11$
$\doteq 0$  $V_i*T_{on}/L/2$     $n11 = \sqrt{(Lm1/L1)}$
                                  $0 \leq n11 \leq 1,\ 0 \leq k11 \leq 1$ or  ditto  ditto   @ Coupling between L2 and Lm2: $k22=n22$
$V_i*T_{on}/L/2$       $\doteq 0$      $n22 = \sqrt{(Lm2/L2)}$
                                  $0 \leq n22 \leq 1,\ 0 \leq k22 \leq 1$ or 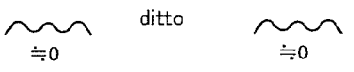 ditto 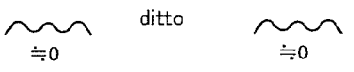 ditto   @ Coupling between L1 and Lm1: $k11=n11$
$\doteq 0$       $\doteq 0$     Coupling between L2 and Lm2: $k22=n22$
                                  $n11 = \sqrt{(Lm1/L1)}$
                                  $0 \leq n11 \leq 1,\ 0 \leq k11 \leq 1$
                                  $n22 = \sqrt{(Lm2/L2)}$
                                  $0 \leq n22 \leq 1,\ 0 \leq k22 \leq 1$ (D)
Ripple voltages under conditions below
$L1 = L2 = L$
$Lm1 = Lm2 = Lm$

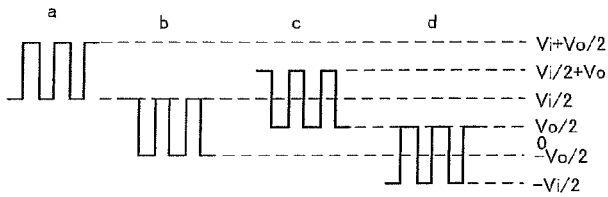

(E)
Voltages across coils under conditions below
$L1 = L2 = L$
$Lm1 = Lm2 = Lm$

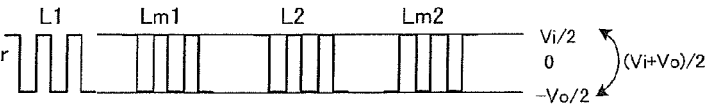

FIG. 2
(A) Circuit shematic
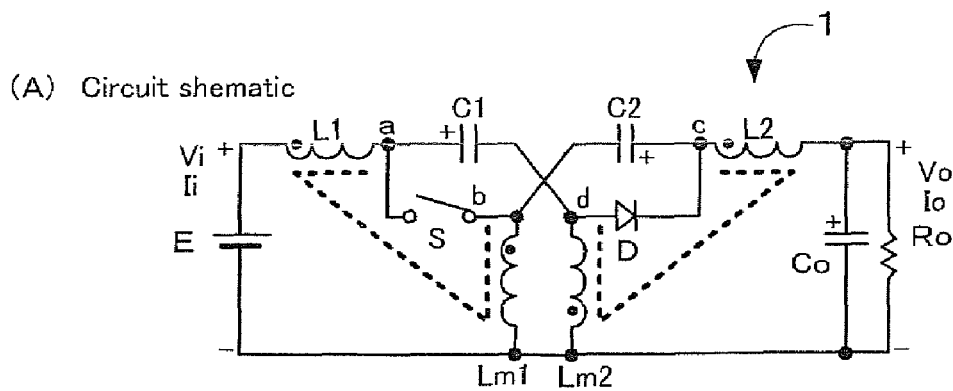
(B) Node potentials and currents when switch S is ON
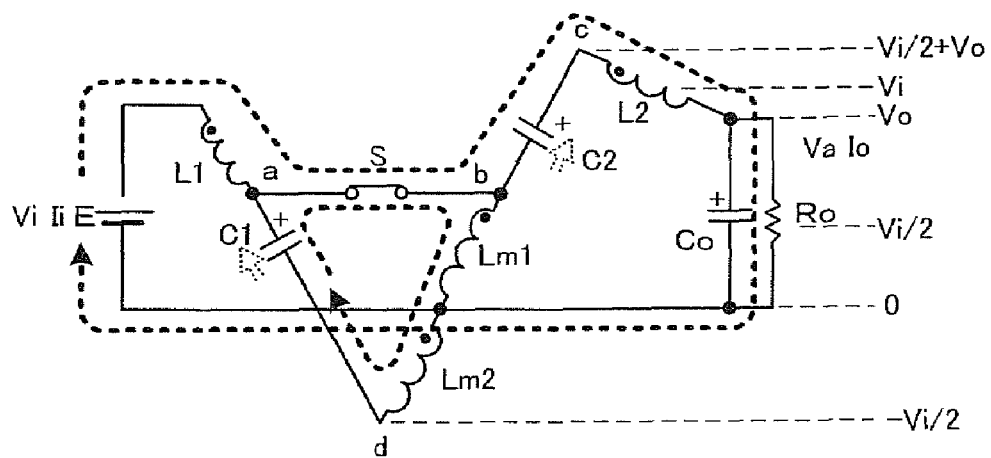
(C) Node potentials and currents when switch S is OFF
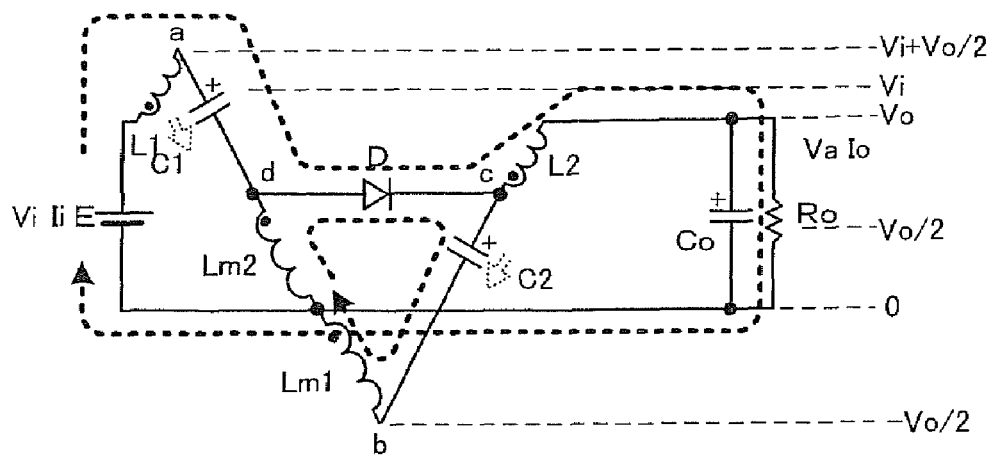

L1=L2=50 μH, Lm1=Lm2=50 μH, no coupling
(A) ~ (D) : voltages across coils
(E) ~ (H) : ripple currents through coils L1=L2=50 μH, Lm1=Lm2=50 μH, coupled (k=n=1)
(A) ~ (D) : voltages across coils
(E) ~ (H) : ripple currents through coils L1=L2=118μH, Lm1=Lm2=50μH, no coupling
(A) ~ (D) : voltages across coils
(E) ~ (H) : ripple currents through coils

FIG.12
(A)
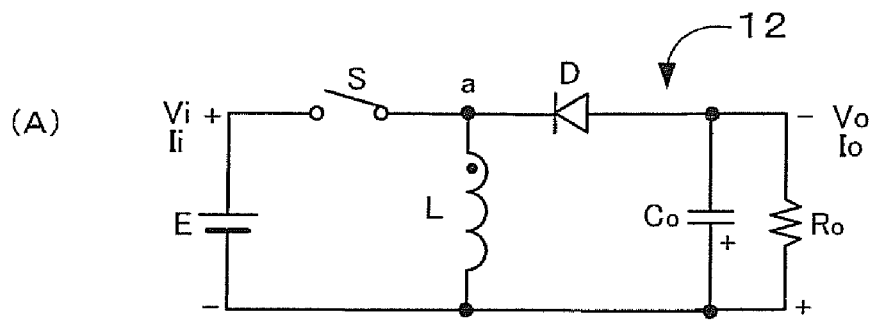
(B)
Transfer function   $V_o = -V_i * D/(1-D)$   (step-up/down, opposite polarity of input/output voltages)
$V_i = -V_o * (1-D)/D$
$D = V_o/(V_i + V_o)$
(C)
Ripple current
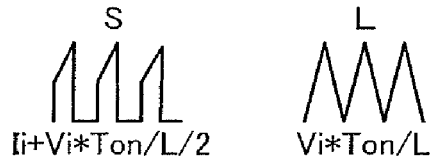
$I_i + V_i * T_{on}/L/2$      $V_i * T_{on}/L$
(D)
Ripple voltage
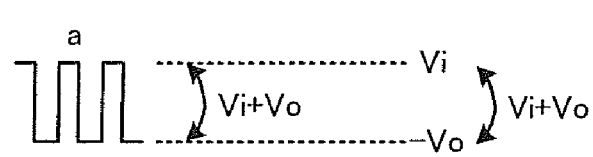
(E)
Voltage across coil
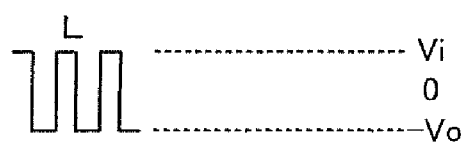

FIG. 15
(A)
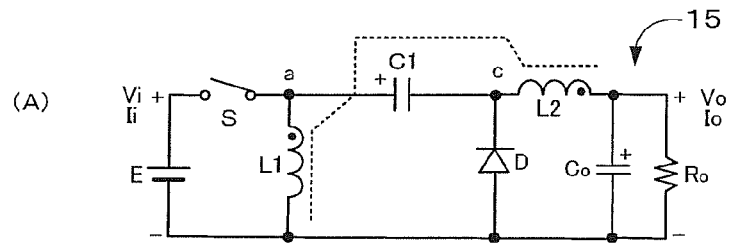
(B)
Transfer function
$V_o = V_i * D/(1-D)$ (step-up/down, same polarity of input/output voltages)
$V_i = V_o * (1-D)/D$
$D = V_o/(V_i+V_o)$
(C)
Ripple currents
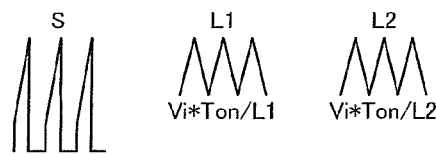
or
@Coupling between L1 and L2 (k = n)
$n = \sqrt{(L1/L2)}$
$k = n$ or $k = 1/n$, $0 \leq k \leq 1$
or
@Coupling between L1 and L2 (K=1/n)
(D)
Ripple voltages
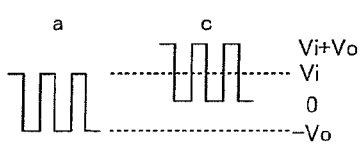
(E)
Voltages across coils
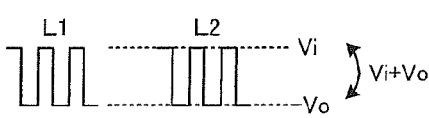

FIG. 16
(A)
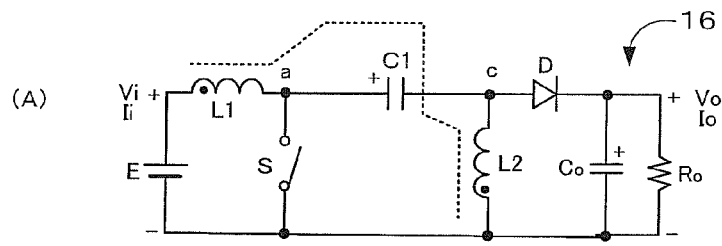
(B)
Transfer function  $V_o = V_i * D/(1-D)$ (step-up/down, same polarity of input/output voltages)
$V_i = V_o * (1-D)/D$
$D = V_o/(V_i + V_o)$
(C)
Ripple currents
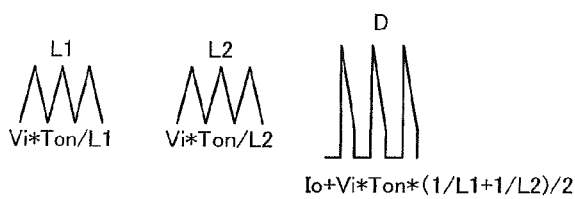
$I_o + V_i * T_{on} * (1/L_1 + 1/L_2)/2$
or
@Coupling between L1 and L2 (k=n)
$n = \sqrt{(L_1/L_2)}$
k=n or k=1/n, $0 \leq k \leq 1$
$I_o + V_i * T_{on}/L_1/2$
or
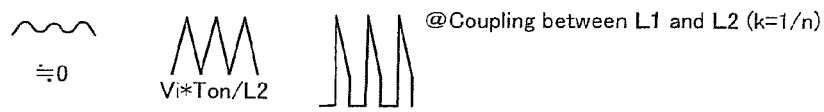
@Coupling between L1 and L2 (k=1/n)
$I_i + V_i * T_{on}/L_2/2$
(D)
Ripple voltages
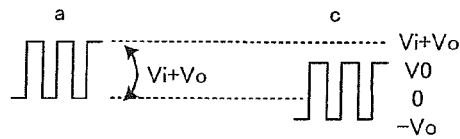
(E)
Voltages across coils
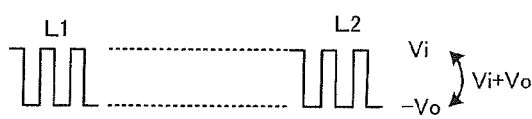

DC-DC CONVERTER

INCORPORATION BY REFERENCE

This application is based upon and claims the benefit of priority from Japanese patent application no. 2007-171688, filed on Jun. 29, 2007, the disclosure of which is incorporated herein in its entirety by reference.

FIELD OF THE INVENTION

The present invention relates to a DC-DC converter, more specifically to anon-isolated (or non-insulated) type switching DC-DC converter for stepping-up or stepping down a relatively fluctuating input power supply voltage of a solar panel or the like to a stabilized desired output voltage.

BACKGROUND OF THE INVENTION

A power supply for providing a desired output voltage is absolutely necessary in order to cause an electronic circuit or electronic circuitries for various electronic apparatus, applied electronic apparatus or the like to operate properly. It is generally impossible or very difficult to obtain such output voltage directly from a voltage source such as a battery or the like. Particularly, a power supply for driving an electronic apparatus installed in an artificial satellite, a planet explore or the like employs a DC-DC converter for controlling the voltage of a solar panel as an input power supply to provide a desired output voltage. In such DC-DC converter, it is required to provide a stabilized output voltage by stepping-up or stepping-down a largely fluctuating input power supply with low noise and power loss. Conventional examples or general technologies of utilizing a solar panel as an input power supply will be described hereunder.

In case of a stepping-down DC-DC converter, it is necessary to adjust the number of solar panels to be connected in series so that the output voltage from the solar panels (i.e., the input power source voltage) is always higher than the output voltage of the DC-DC converter. If the voltage from the solar panels fluctuates over a wide range, the maximum or peak output voltage from the solar panels tends to be very high, it is difficult to properly design the DC-DC converter.

On the other hand, in case of using a stepping-up DC-DC converter, the number of solar panels to be connected in series must be adjusted so that the output voltage from the solar panels is always lower than the output voltage from the DC-DC converter. If the voltage from the solar panels fluctuates largely, it is also difficult to properly design the DC-DC converter in this case because the output voltage from the solar panels could become very low.

Accordingly, it is possible to properly set the range of the output voltage from the solar panels when a stepping-up/down DC-DC converter in which the input voltage from the solar panels can be stepped-up or down to the output voltage of the DC-DC converter, i.e., the voltage that is required to supply to a load. However, a non-isolated stepping-up/down DC-DC converter with low power consumption has such a problem that the input and output voltages are in opposite polarity to each other and thus difficult to handle. Moreover, it is essential that the DC-DC converter to be used for the aforementioned planet explorer or the like causes minimum noise (switching noise) because its primary purpose is to observe very weak electric field or magnetic field in the vicinity of planets.

Now, a brief description will be given on a typical non-isolated stepping-up/down switching DC-DC converter with reference to FIGS. 12-16. All of these DC-DC converters have common problems that the input and output voltages are opposite polarity to each other and the input and output currents are pulse waves, thereby exhibiting large noise. This means that the pulsating input and output currents have large amplitudes at the switching frequency and a large rate of change in time, thereby providing a large noise at the switching frequency as well as large harmonic noises at the frequencies equal to the switching frequency multiplied by any integer.

FIG. 12 is a first example of conventional DC-DC converters (or a Buck-Boost converter), wherein (A) is a circuit schematic, (B) is a transfer function, (C) is a ripple current, (D) is a ripple voltage and (E) is the voltage across the coil L in FIG. 12(A). As shown in FIG. 12(A), the DC-DC converter 12 comprises an input voltage source E, a switch S, a coil (or inductor) L, a diode D, a load resistor Ro and a load capacitor Co. The switch S and the coil L are connected in series across the input voltage source E. Also, the load resistor Ro and the load capacitor $C_o$ are connected in parallel across the both ends of the coil L by way of the diode D. It is assumed that the voltage of the input voltage source E and the output voltage across the load resistor Ro are Vi and Vo, respectively.

When the switch S is periodically turned ON and OFF in the DC-DC converter 12 as shown in FIG. 12, the ripple current as shown in FIG. 12(C) flows through the switch S and the coil L and develops a coil voltage of a square pulse that varies between −Vo and Vi as shown in FIG. 12(E), thereby supplying an output voltage −Vo to the load Ro. In other words, the input voltage Vi and the output voltage Vo of the DC-DC converter 12 are opposite to each other and the input current Ii and the output current Io are pulse waves.

Now, FIG. 13 is a second example of conventional DV-DC converter (or a Cuk converter), wherein (A) is a circuit schematic, (B) is a transfer function, (C) is a ripple current, (D) is a ripple voltage and (E) is a coil voltage. As shown in FIG. 13, the DC-DC converter 13 comprises an input voltage source E, a first coil L1, a switch S, a capacitor C1, a diode D, a second coil L2, a load resistor Ro and a load capacitor Co. The first coil L1 and the switch S are connected in series between both ends of the input voltage source E. The capacitor C1 and the diode D are connected in series across the switch S. Moreover, the load resistor Ro and the road capacitor Co are connected in parallel across the diode D by way of the second coil L2.

In the DC-DC converter 13, ripple currents through the first coil L1 and the second coil L2 are shown in FIG. 13(C). The ripple currents shown at the top are the case when there is no magnetic coupling between these coils L1, L2. The ripple currents shown in the middle are the case when the magnetic coupling coefficient k between these coils L1, L2 is equal to n. On the other hand, the ripple currents at the bottom show the case when the magnetic coupling coefficient k between these coils L1, L2 is equal to 1/n. Although the input and output ripple currents can be made to combination of a triangle wave and a 0 ripple or a 0 ripple and a triangle wave, it is to be noted that the input voltage Vi and the output voltage Vo are opposite polarity to each other similar to the case in the aforementioned DC-DC converter 12.

Now, shown in FIG. 14 is a third example of conventional DC-DC converters (or a Cuk converter with an intermediate coil), wherein (A) is a circuit schematic, (B) is a transfer function, (C) is a ripple current, (D) is a ripple voltage and (E) a voltage across the coil. As shown in FIG. 14(A), the DC-DC converter 14 comprises an input voltage source E, an input coil L1, a switch S, a pair of capacitors C1, C2, an intermediate coil Lm, a diode D, an output coil L2, a load resistor Ro and a load capacitor Co. The input coil L1 and the switch S are connected in series between both terminals of the input voltage source E. The capacitor C1 and the intermediate coil Lm are connected in series between both terminals of the switch S. The capacitor C2 and the diode D are connected in series between both terminals of the intermediate coil Lm. Moreover, the load resistor Ro and the load capacitor Co are connected in parallel between the both ends of the diode D by way of the output coil L2. It is to be noted that the input coil L1, the intermediate coil Lm and the output coil L2 can be magnetically coupled in a predetermined polarity relationship.

Shown in FIG. 14(C) are generally triangle ripple currents through the input coil L1, the intermediate coil Lm and the output coil L2 sequentially disposed in left to right directions. Ripple voltages developed by these ripple currents across such coils are also shown in FIG. 14(D). As shown in FIG. 14(C), both of the input current through the input coil L1 and the output current through the output coil L2 in the DC-DC converter 14 can be made substantially 0 ripple. However, similarly to the aforementioned DC-DC converters 12 and 13, the input voltage Vi and the output voltage supplied to the load are opposite polarity to each other.

Now, shown in FIG. 15 is a fourth example of conventional DC-DC converters (or a Zeta converter), wherein (A) is a circuit schematic, (B) is a transfer function, (C) is ripple currents, (D) is ripple voltages and (E) is a coil voltage. As shown in FIG. 15(A), the DC-DC converter 15 comprises an input voltage source E, a switch S, an input coil L1, a capacitor C1, a diode D, an output coil L2, a load resistor Ro and a load capacitor Co. The switch S and the input coil L1 are connected in series between both ends of the input voltage source E. The capacitor C1 and the diode D are connected in series between the both ends of the input coil L1. The load resistor Ro and the load capacitor Co are connected in parallel between the both ends of the diode D by way of the output coil L2. The input coil L1 and the output coil L2 are magnetically coupled to each other.

As shown in FIG. 15(C), the currents flowing through the switch S, the input coil L1 and the output coils L2 change depending upon the magnetic coupling factor k between the both coils L1 and L2. Shown at the top are the currents when there is no magnetic coupling between the both coils L1 and L2. Shown at the middle are currents when the magnetic coupling factor k is equal to n. Shown at the bottom are currents when the magnetic coupling factor k is equal to 1/n. Although the input voltage Vi and the output voltage Vo are the same polarity in the DC-DC converter 15, the input current Ii is pulsating.

Now, FIG. 16 shows a fifth example of conventional DC-DC converters (or a Sepic converter), wherein (A) is a circuit schematic, (B) is a transfer function, (C) is ripple currents, (D) is a ripple voltage and (E) is a coil voltage. As shown in FIG. 16(A), the DC-DC converter 16 comprises an input voltage source E, an input coil L1, a switch S, a capacitor C1, an output coil L2, a diode D, a load resistor Ro and a load capacitor Co. The input coil L1 and the switch S are connected in series between both terminals of the input voltage source E. The capacitor C1 and the output coil L2 are connected in series between the both ends of the switch S. Moreover, the load resistor Ro and the load capacitor Co are connected in parallel between the both ends of the output coil L2 by way of the diode D. The input coil L1 and the output coil L2 are magnetically coupled to each other with a magnetic coupling factor k.

As shown in FIG. 16(C), the ripple currents flowing through the input coil L1, the output coil L2 and the diode D change in triangle pulse waves depending upon the magnetic coupling factor k between the input coil L1 and the output coil L2. Although the input voltage Vi and the output voltage Vo to be supplied to the load are the same polarity to each other in the DC-DC converter 16, the output current Io is pulsating.

As described hereinabove, the conventional DC-DC converters as shown in FIGS. 12-16 are difficult to handle because of opposite polarity between the input and output voltages or difficult to be applied to such applications critical to noise because they are subjected to a large noise due to ripples in the input and output currents.

SUMMARY OF THE INVENTION

In light of the problems associated with conventional DC-DC converters, it is the object of the present invention to overcome such problems and provide a DC-DC converter to provide a non-inverted output (i.e., the input and output voltages of the same polarity to each other) and also reduce noise by decreasing ripples in the input and output currents.

In order to overcome the aforementioned problems associated with prior art and achieve the above object, the DC-DC converter according to the present invention is a non-isolated DC-DC converter to step-up/down the voltage of an input voltage source for supplying a desired non-inverted output voltage to a load, comprising: an input coil, an input capacitor and a second intermediate coil connected between both terminals of the input voltage source; an output coil, an output capacitor and a first intermediate coil connected in series between both ends of the load, a switching device connected between a node of the input coil and the input capacitor and a node of the first intermediate coil and the output capacitor; and a diode connected between a node of the input capacitor and the second intermediate coil and a node of the output capacitor and the output coil.

The DC-DC converter according to the present invention exhibits the following practical advantages. That is, it is possible to provide the non-isolated DC-DC converter having the output voltage of any desired value and the same polarity (or non-inverted) by stepping-up/down the voltage of the input voltage source while reducing the noise. Accordingly, the DC-DC converter according to the present invention is most suitable to those applications to provide a stabilized output voltage to be supplied to the load from solar panels installed on planet explores or the like. Moreover, the DC-DC converter according to the present invention is not complicated and expensive as compared to conventional DC-DC converters because the required circuit elements are coils, capacitors, a switching device and a diode.

BRIEF DESCRIPTION OF THE DRAWINGS

In the accompanying drawings,

FIG. 1 is a first embodiment of the conventional DC-DC converter according to the present invention, wherein (A) is the circuit schematic, (B) is a transfer function, (C) is ripple currents, (D) is ripple voltages and (E) is a coil voltage;

FIG. 2 is operational illustrations of the DC-DC converter as shown in FIG. 1, wherein (A) is the circuit schematic, (B) shows current flows when the switch is ON and (C) shows current flows when the switch is OFF;

FIG. 12 illustrates a first example of conventional DC-DC converters, wherein (A) is the circuit schematic, (B) is a transfer function, (C) is ripple currents, (D) is a ripple voltage and (E) is a coil voltage;

FIG. 15 illustrates a fourth example of conventional DC-DC converters, wherein (A) is the circuit schematic, (B) is a transfer function, (C) is ripple currents, (D) is a ripple voltage and (E) is a coil voltage; and FIG. 16 illustrates a fifth example of conventional DC-DC converters, wherein (A) is the circuit schematic, (B) is a transfer function, (C) is ripple currents, (D) is a ripple voltage and (E) is a coil voltage.

DETAILED DESCRIPTION OF EXEMPLARY EMBODIMENTS

Figure 3:
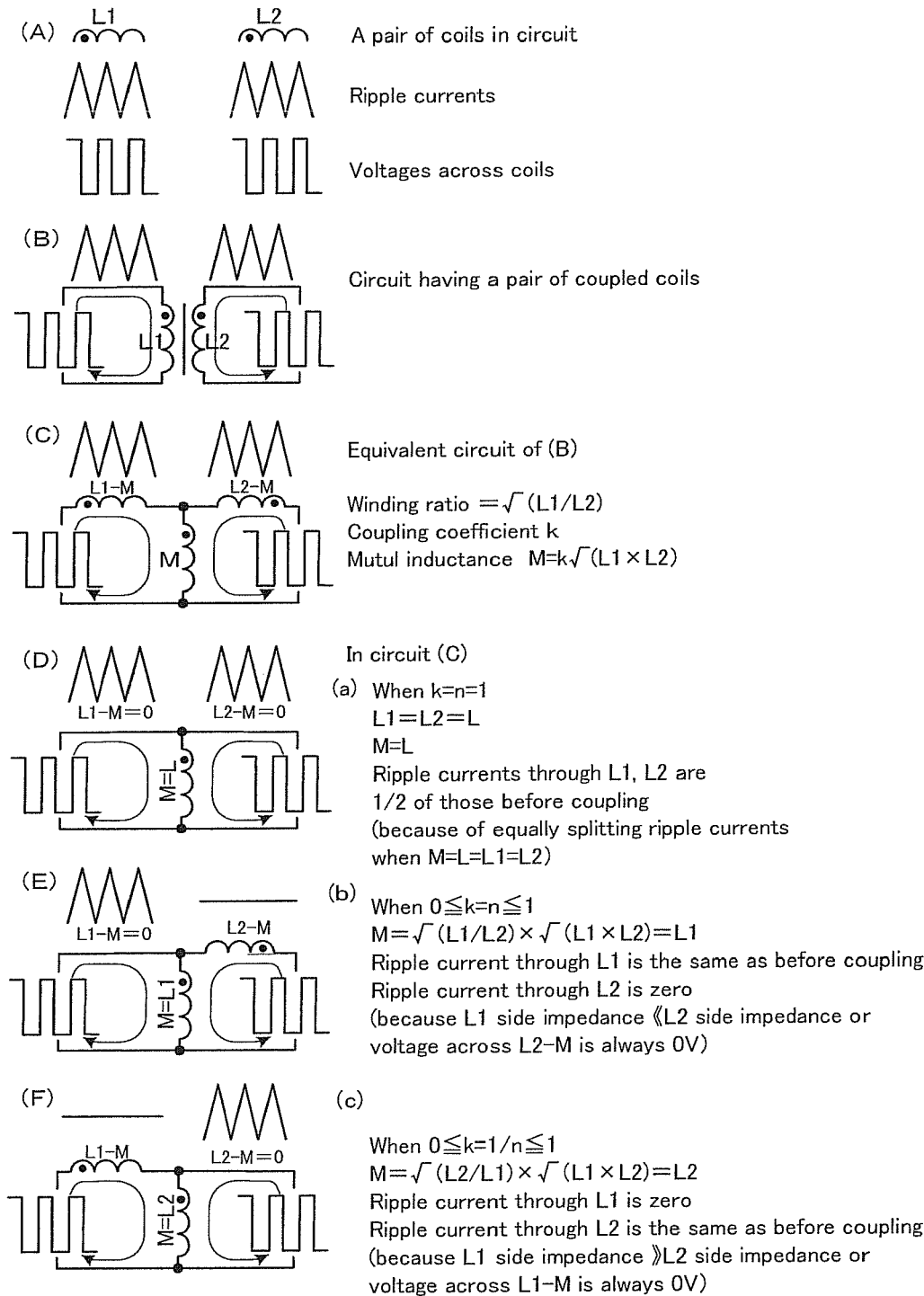
FIG. 3 shows diagrams for describing the principle of ripple currents flowing through input and output coils.

Now, exemplified embodiments of the DC-DC converter according to the present invention will be described in detail in their construction and operation with reference to accompanying drawings.

Firstly, a reference is made to FIG. 1 illustrating a first embodiment of the DC-DC converter according to the present invention. In FIG. 1, (A) is the circuit schematic of the first embodiment of the DC-DC converter according to the present invention, (B) is a transfer function, (C) is ripple currents, (D) is a ripple voltage and (E) is a coil voltage.

As shown in FIG. 1(A), the DC-DC converter 1 comprises an input voltage source E, an input coil (or an inductor) L1, an output coil L2, a first intermediate coil Lm1, a second intermediate coil Lm2, an input (or a first intermediate) capacitor C1, an output (or a second intermediate) capacitor C2, a switch S, a diode D and a parallel connection of a load resistor Ro and an output (or a smoothing) capacitor Co.

The input coil L1, the input capacitor C1 and the second intermediate coil Lm2 are connected in series between the both terminals of the input voltage source E. Connected in series between both ends of the parallel connection of the load resistor Ro and the load capacitor Co are the output coil L2, the output capacitor C2 and the first intermediate coil Lm1. Junctions of the input coil L1 and the input capacitor C1, the first intermediate coil Lm1 and the second intermediate capacitor C2, the output coil L2 and the output capacitor C2 and the input capacitor C1 and the second intermediate coil Lm2 are referred to as nodes a, b, c and d, respectively. The switch S is connected between the node a and the node b. The diode D is connected between the node d and the node c. It is to be noted herein that the input coil L1 and the first intermediate coil Lm1 as well as the output coil L2 and the second intermediate coil Lm2 can be magnetically coupled to each other with a predetermined polarity relationship.

FIG. 1(C) shows from left to right ripple currents flowing through the input coil L1, the first intermediate coil Lm1, the output coil L2 and the second intermediate coil Lm2. Also shown in FIG. 1(C) from top to bottom are ripple currents in the respective coils L1, Lm1, L2 and Lm2 under different magnetic coupling conditions between the input coil L1 and the first intermediate coil Lm1 and between the output coil L2 and the second intermediate coil Lm2 as described in the remarks at the right side. When there is no magnetic coupling between the coils L1-Lm1 and L2-Lm2, the ripple currents through all of these coils L1, Lm1, Lm2 and L2 are relatively large triangle waves. On the other hand, when there is magnetic coupling, the ripple currents through the input coil L1 and the output coil L2 are either substantially zero ripple or triangle waves. However, the ripple currents through the intermediate coils Lm1 and Lm2 remain triangle waves.

On the other hand, the ripple voltages at the four nodes a-d in FIG. 1(A) are rectangular waves as shown in FIG. 1(D). The output voltage Vo to be supplied across both ends of the load resistor Ro of the non-isolation stepping up/down DC-DC converter 1 is the same polarity as the input voltage Vi. Moreover, since there is no pulsating ripple current, the DC-DC converter 1 features low noise performance.

Now, the operation of the first embodiment of the DC-DC converter 1 according to the present invention will be described in greater detail with reference to FIG. 2. FIG. 2(A) is the circuit schematic of the DC-DC converter 1 that is the same as the one as shown in FIG. 1(A). FIG. 2(B) shows potentials at and currents through the nodes a-d when the switch S in FIG. 2(A) is ON. FIG. 2(C) shows potentials at and currents through the nodes a-d when the switch S is OFF.

When the switch S is ON, exciting currents flow through all of the coils L1, Lm1, Lm2 and L2 and the current flows to the output (or the load resistor Ro) from the input voltage source E as indicated by dotted lines in FIG. 2(B). Also currents flow through the input and output capacitors C1 and C2 in the discharge direction. On the other hand, when the switch S is OFF, a release current flows to the output from the input voltage source E by way of all of the coils L1, Lm1, Lm2 and L2 as well as the diode D as shown in FIG. 2(C). In this case, the currents through the capacitors C1 and C2 flow in the charging direction or in opposite direction to the case when the switch S is ON as shown in FIG. 2(B).

As will be described hereinafter, the potentials at the nodes a-d as shown in FIGS. 2(B) and (C) are values in case of L1=L2 (i.e., when the inductance of the input coil L1 is equal to that of the output coil L2) and Lm1=Lm2 (i.e., when the inductance of the first intermediate coil Lm1 is equal to that of the second intermediate coil Lm2). The input voltage and the output voltage are the same polarity to each other. It is to be noted that no matter if the switch S is ON and OFF, currents flow through the input coil L1 and the output coil L2 (going up rightward when the switch S is ON, while going down rightward when the switch S is OFF) in triangle waves rather than sharply changing pulse waves such as rectangular waves or the like.

Now, analysis of the operation of the DC-DC converter 1 according to the present invention will be made. It is assumed in the following analysis that the switch S is an ideal switch, the diode D is an ideal diode and time durations when the switch S is ON and OFF are ton and toff, respectively. Also, the impedance of the input capacitor C1 and the output capacitor C2 is sufficiently low at the switching frequency (i.e., having sufficiently large capacitance). The input capacitor C1 is considered to be a voltage source having the same voltage Vi as the input voltage source E and the output capacitor C2 to be a voltage source having the same voltage Vo as the output voltage.

(a) When the switch S is ON:

The relationship between the potential Va-Vd at each node a-d and the amplitudes of the ripple current ΔIa-ΔId through each coil can be given by the following mathematical formulas (1):

$$Va=Vb$$

$$Vc=Va+Vo$$

$$Vd=Va-Vi$$

$$\Delta IL1+\Delta ILm2=\Delta ILm1+\Delta IL2$$

The amplitudes of the ripple currents through the respective coils L1, Lm1, L2 and Lm2 (or ΔIL1, ΔILm1, ΔIL2 and ΔILm2) are given by the following mathematical formulas (2) (wherein ⇒ represents the case when L1=L2 and Lm1=Lm2):

$$\Delta IL1 = (1/Lm1 + 1/L2)/(1/L1 + 1/Lm1 + 1/L2 + 1/Lm2) \times Vi \times ton/L1 \Rightarrow (Vi \times ton/L1/2)$$

$$\Delta ILm1 = (1/L1 + 1/Lm2)/(1/L1 + 1/Lm1 + 1/L2 + 1/Lm2) \times Vi \times ton/Lm1 \Rightarrow (Vi \times ton/Lm1/2)$$

$$\Delta IL2 = (1/L1 + 1/Lm2)/(1/L1 + 1/Lm1 + 1/L2 + 1/Lm2) \times Vi \times ton/L2 \Rightarrow (Vi \times ton/L2/2)$$

$$\Delta ILm2 = (1/Lm1 + 1/L2)/(1/L1 + 1/Lm1 + 1/L2 + 1/Lm2) \times Vi \times ton/Lm2 \Rightarrow (Vi \times ton/Lm2/2)$$

Potentials on the nodes a, b, c and d (or Va, Vb, Vc and Vd) are given by the following mathematical formulas (3) (wherein ⇒ represents the case when L1=L2 and Lm1=Lm2):

$$Va = (1/L1 + 1/Lm2)/(1/L1 + 1/Lm1 + 1/L2 + 1/Lm2) \times Vi \Rightarrow (Vi/2)$$

$$Vb = (1/L1 + 1/Lm2)/(1/L1 + 1/Lm1 + 1/L2 + 1/Lm2) \times Vi \Rightarrow (Vi/2)$$

$$Vc = (1/L1 + 1/lm2)/(1/L1 + 1/Lm1 + 1/L2 + 1/Lm2) \times Vi + Vo \Rightarrow (Vi/2 + Vo)$$

$$Vd = -(1/Lm1 + 1/L2)/(1/L1 + 1/Lm1 + 1/L2 + 1/Lm2) \times Vi \Rightarrow (-Vi/2)$$

Voltages across the coils L1, Lm1, L2 and Lm2 (or VL1, VLm1, VL2 and Vlm2) are given by the following mathematical formulas (4) (wherein ⇒ represents the case when L1=L2 and Lm1=Lm2):

$$VL1=(1/Lm1+1/L2)/(1/L1+1/Lm1+1/L2+1/Lm2)\times Vi \Rightarrow (Vi/2)$$

$$VLm1=(1/L1+1/Lm2)/(1/L1+1/Lm1+1/L2+1/Lm2)\times Vi \Rightarrow (Vi/2)$$

$$VL2=(1/L1+1/Lm2)/(1/L1+1/Lm1+1/L2+1/Lm2)\times Vi \Rightarrow (Vi/2)$$

$$VLm2=(1/Lm1+1/L2)/(1/L1+1/Lm1+1/L2+1/Lm2)\times Vi \Rightarrow (Vi/2)$$

(b) When the switch S is OFF:

The relationship between the potentials on the nodes a, b, c and d (or Va, Vb, Vc and Vd) and the ripple currents through the coils L1, Lm1, L2 and Lm2 (or ΔIL1, ΔILm1, ΔIL2 and ΔILm2) are given by the following mathematical formulas (5):

$$Va=Vc+Vi$$

$$Vb=Vc-Vo$$

$$Vc=Vd$$

$$\Delta IL1+\Delta ILm2=\Delta ILm1+\Delta IL2$$

Amplitudes of ripple currents through the coils L1, Lm1, L2 and Lm2 (or ΔIL1, ΔILm1, ΔIL2 and ΔILm2) are given by the following mathematical formulas (6) (wherein ⇒ represents the case when L1=L2 and Lm1=Lm2):

$$\Delta IL1 = (1/L1 + 1/L2)/(1/L1 + 1/Lm1 + 1/L2 + 1/Lm2) \times Vo \times toff/L1 \Rightarrow (Vo \times toff/L1/2)$$

$$\Delta ILm1 = (1/L + 1/Lm2)/(1/L1 + 1/Lm1 + 1/L2 + 1/Lm2) \times Vo \times toff/Lm1 \Rightarrow (Vo \times toff/Lm1/2)$$

$$\Delta IL2 = (1/L1 + 1/ILm2)/(1/L1 + 1/Lm1 + 1/L2 + 1/Lm2) \times Vo \times toff/L2) \Rightarrow (Vo \times toff/L2/2)$$

$$\Delta ILm2 = (1/Lm1 + 1/L2)/(1/L1 + 1/Lm1 + 1/L2 + 1/Lm2) \times Vo \times toff/Lm2 \Rightarrow (Vo \times toff/Lm2/2)$$

Potentials on the nodes a, b, c and d (or Va, Vb, Vc and Vd) are given by the following mathematical formulas (7) (wherein ⇒ represents the case when L1=L2 and Lm1=Lm2):

$$Va=(1/Lm1+1/L2)/(1/L1+1/Lm1+1/L2+1/Lm2)\times Vo+Vi \Rightarrow (Vi+Vo/2)$$

$$Vb=-(1/Lm1+1/L2)/(1/L1+1/Lm1+1/L2+1/Lm2)\times Vo \Rightarrow (-Vo/2)$$

$$Vc=(1/Lm1+1/L2)/(1/L1+1/Lm1+1/L2+1/Lm2)\times Vo \Rightarrow (Vo/2)$$

$$Vd=-(1/Lm1+1/L2)/(1/L1+1/Lm1+1/L2+1/Lm2)\times Vo \Rightarrow (-Vo/2)$$

Voltages across the coils L1, Lm1, L2 and Lm2 (or VL1, Vlm1, VL2 and VLm2) are given by the following mathematical formulas (8) (wherein ⇒ represents the case when L1=L2 and Lm1=Lm2):

$$VL1 = -(1/Lm1+1/L2)/(1/L1+1/Lm1+1/L2+1/Lm2) \times Vo \Rightarrow (-Vo/2)$$

$$Vlm1 = -(1/L1+1/Lm2)/(1/L1+1/Lm1+1/L2+1/Lm2) \times Vo \Rightarrow (-Vo/2)$$

$$VL2 = -(1/L1+1/Lm2)/(1/L1+1/Lm1+1/L2+1/Lm2) \times Vo \Rightarrow (-Vo/2)$$

$$VLm2 = -(1/Lm1+1/L2)/(1/L1+1/Lm1+1/L2+1/Lm2) \times Vo \Rightarrow (-Vo/2)$$

Conditions for proper operation of the converter are given by the following mathematical formulas (9):

$\Delta ILx(ON) = \Delta ILx(OFF)$ (i.e., the formulas (2)=the formulas (6))

$Vlx(ON) \times ton = -VLx(OFF) \times toff$ (i.e., the formulas (4)=the formulas (8))

It is to be noted in the above formulas that the Lx means either one of the coils L1, Lm1, L2 and Lm2.

A solution of the above equations gives the following formula (10):

$$Vo = Vi \times ton/toff = Vi \times D/(1-D)$$

where, $D = ton/(ton+toff)$ (c) Reducing or zero rippling the input/output ripple currents:

Now, FIG. 3 shows conventional concept of reducing or zero rippling the ripple currents. It is assumed that a circuit includes a pair of coils L1 and L2 that develop identical voltages between their both terminals as shown in FIG. 3(a). When the pair of coils L1 and L2 are magnetically coupled in the same polarity as shown in FIG. 3(B), the equivalent circuit is as shown in FIG. 3(C). When the pair of coils L1 and L2 are in the relationship in coupling coefficient and winding ratio as shown in FIG. 3(D)(a), the ripple current in each coil can be reduced to ½. When the coupling factor and the winding ratio are in the relationship as shown in FIG. 3(E)(b), the ripple current through the coil L1 remains unchanged by the coupling, while zero rippling the ripple current through the coil L2. On the other hand, when the coupling factor and the winding ratio are in the relationship as shown in FIG. 3(F)(c), the ripple current in the coil L1 becomes zero (zero rippling), while the ripple current through the coil L2 remains unchanged by the coupling.

As shown in FIG. 1 and by the mathematical formulas (4) and (8), in the above described DC-DC converter 1 according to the present invention, the relationships of VL1=VLm2 and VL2=VLm2 are always maintained. Particularly, if L1=L2 and Lm1=Lm2, then VL1=Vlm1=VL2=VLm2, thereby equalizing voltage waveforms across both ends of the input coil L1, the output coil L2 and the intermediate coils Lm1, Lm2. Accordingly, it is possible to reduce the ripple currents through the input coil L1 and/or the output coil L2 by properly coupling these coils L1-Lm1 and the coils L2-Lm2.

FIG. 1(C) shows current waveforms to achieve zero rippling of only the current through the input coil L1 by coupling the input coil L1 and the first intermediate coil Lm1, of only the current through the output coil L2 by coupling the output coil L2 and the second intermediate coil Lm2 and of the currents through both of the input coil L1 and the output coil L2 by coupling the input coil L1—the first intermediate coil Lm1 and the output coil L2—the second intermediate coil Lm2. Other than the above examples, as described hereinabove the concept of reducing or zero rippling, it is also possible to reduce the ripple currents through the input coil L1, the output coil L2 and the first and second intermediate coils Lm1, Lm2 to ½ of non-coupling conditions by coupling the input coil L1—the first intermediate coil Lm1 and the output coil L2—the second intermediate coil Lm2 with the winding ratio=1 and the coupling factor=1. Moreover, similar results will be achieved by interchanging the combinations of coils to be coupled, i.e., coupling the input coil L1—the second intermediate coil Lm2 and the output coil L2—the first intermediate coil Lm1.

Figure 4:
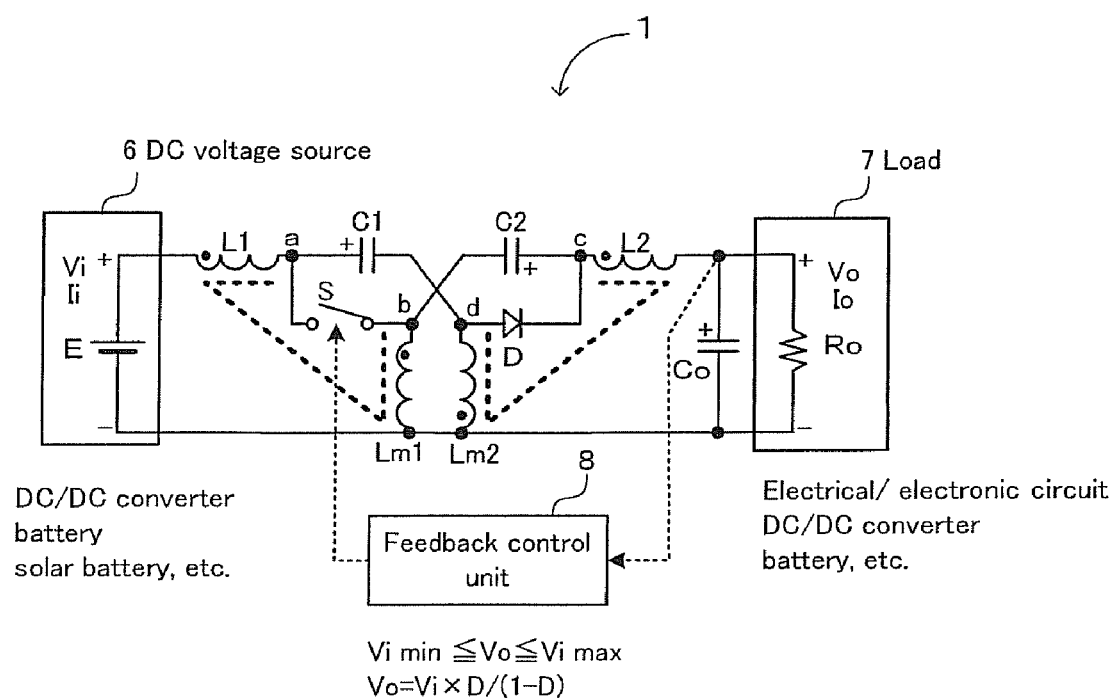
FIG. 4 is the circuit schematic of a practical application of the DC-DC converter as shown in FIG. 1.

Now, FIG. 4 is a practical example of applying the DC-DC converter 1 according to the present invention. The output voltage Vi of an unstable DC voltage source 6 such as a battery, a solar panel or the like is stepped up/down by the DC-DC converter 1 according to the present invention in order to obtain a stabilized output voltage Vo to be supplied to a load 7 such as an electrical or electronic circuit, another DC-DC converter or battery and the like. The ON time of the switch S is controlled by a known feedback control section 8 for feeding back the output voltage Vo so as to make the output voltage Vo to a desired voltage. In FIG. 4, the input coil L1—the first intermediate coil Lm1 and the output coil—the second intermediate coil Lm2 are suitably coupled as described hereinabove to achieve reduction or zero rippling of the ripple currents through the input coil L1 and the output coil L2.

In FIG. 4, the DC-DC converter 1 comprises the input coil L1, the output coil L2, the first intermediate coil Lm1, the second intermediate coil Lm2, the input (first intermediate) capacitor C1, the output (second intermediate) capacitor C2, the switch S, the diode D and the load (output) capacitor Co. A load 7 includes a load resistor Ro. Also comprises is a feedback control section 8 for controlling the ON time of the switch S by feeding back the output voltage Vo to be supplied to the load 7.

Figure 5:
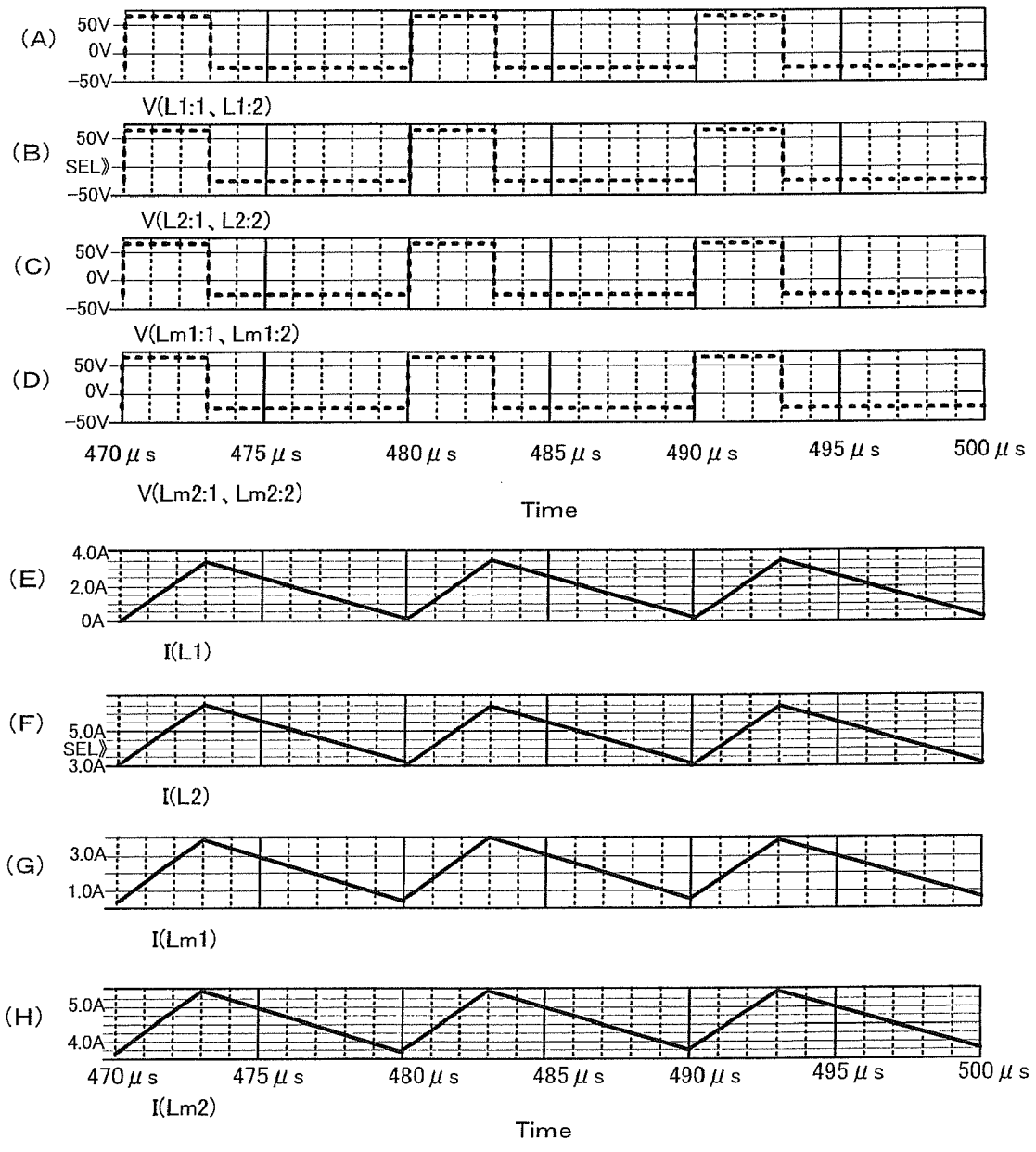
FIG. 5 illustrates operational waveforms of the DC-DC converter as shown in FIG. 1 when each coil has 50 μH inductance and there is no magnetic coupling between the coils, wherein (A)-(D) and (E)-(H) are voltage waveforms across and ripple current waveforms through the input coil, the output coil, the first and second intermediate coils, respectively.
Figure 6:
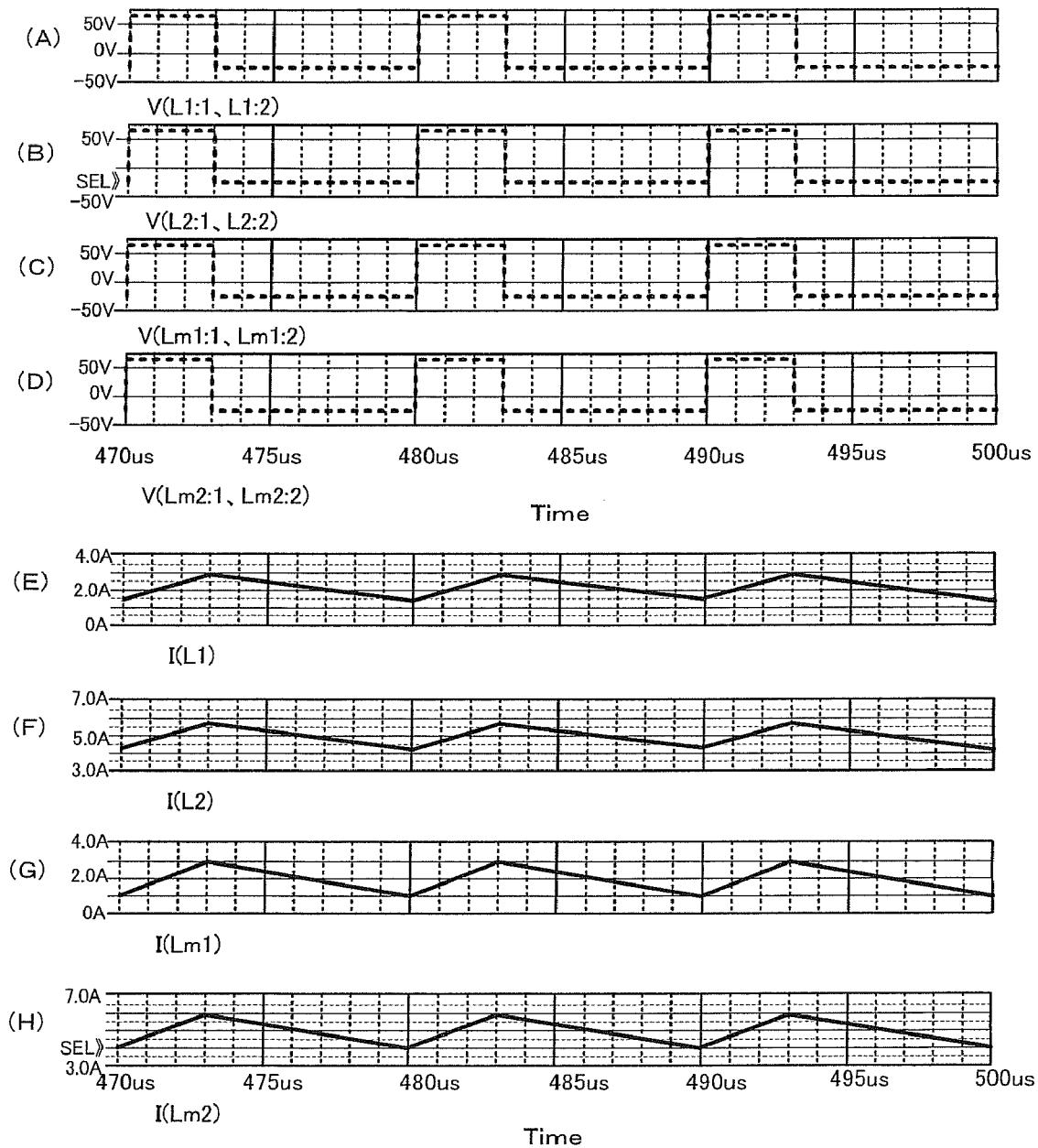
FIG. 6 illustrates operational waveforms of the DC-DC converter as shown in FIG. 1 when each coil has 50 μH inductance and there is magnetic coupling coefficient of k=n=1 between the coils, wherein (A)-(H) are waveforms corresponding to those in FIG. 5.

Now, the operation of the DC-DC converter 1 according to the present invention will be described with reference to FIGS. 5 and 6. FIGS. 5 and 6 show operation waveforms as a simulation result under the following conditions to reduce the ripple currents through the input and output coils L1, L2 to ½, or halving the ripple currents:

| | |
|---|---|
| Vi = 120 V | Vo = 50 V |
| L1 = L2 = 50 μH | Lm1 = Lm2 = 50 μH |
| C1 = C2 = 5 μF | Co = 100 μF |
| S = ideal switch | D = ideal diode |
| Switching frequency = 100 kHz | ton = 2.92 μS |

FIG. 5 shows operation waveforms in the practical example of the DC-Dc converter 1 as shown in FIG. 4 when there is no coupling between the coils L1, L2, Lm1 and Lm2. FIG. 5(A)-(D) are the voltage waveforms across the input coil L1, the output coil L2, the first intermediate coil Lm1 and the second intermediate coil Lm2, respectively. On the other hand, FIG. 5(E)-(H) are the ripple currents through the input coil L1, the output coil L2, the first intermediate coil Lm1 and the second intermediate coil Lm2, respectively. When the voltages across all of the coils L1, L2, Lm1 and Lm2 are equal to one another and the switch S is ON, Vi/2≈60V. On the other hand, when the switch S is OFF, -Vo/2≈-25V. These values coincide with the mathematical formulas (2) and (6) that are described hereinabove as solutions according to the present invention.

The ripple currents in the coils are $\Delta IL1=\Delta IL2=Vi/2/L \times ton \approx 3.5A$ and $\Delta ILm1=\Delta ILm2=Vi/2/L \times ton \approx 3.5A$. These values coincide with the results given by the mathematical formulas (4) and (8) that are described hereinabove as solutions according to the present invention.

On the other hand, FIG. 6(A)-(H) are operation waveforms of the practical example of the DC-DC converter 1 as shown in FIG. 4 and corresponding to those in FIG. 5(A)-(H) when the input coil L1—the first intermediate coil Lm1 and the output coil L2—the second intermediate coil Lm2 are coupled with each other under the following conditions:

winding ratio:

| between L1:Lm1 | $n11 = \sqrt{(Lm1/L1)} = 1$ |
|---|---|
| between L2:Lm2 | $n22 = \sqrt{(Lm2/L2)} = 1$ | coupling factor:

| between L1:Lm1 | $k11 = n11 = 1$ |
|---|---|
| between L2:Lm2 | $k22 = n22 = 1$ |

If the voltage across all of the coils L1, L2, Lm1 and Lm2 are equal, $Vi/2 \approx 60V$ when the switch S is ON and $-Vo \approx -25V$ when the switch S is OFF. These values coincide with the results given by the mathematical formulas (2) and (6) that are described hereinabove as the solutions according to the present invention. On the other hand, the ripple currents through the coils L1, L2, Lm1 and Lm2 are $\Delta IL1=\Delta IL2=Vi/2/L \times ton/2 \approx 1.75A$ and $\Delta ILm1=\Delta ILm2=Vi/2/L \times ton/2 \approx 1.75A$. These values coincide with the results of the mathematical formulas (4) and (8) that are described hereinabove as the solutions according to the present invention.

Figure 7:
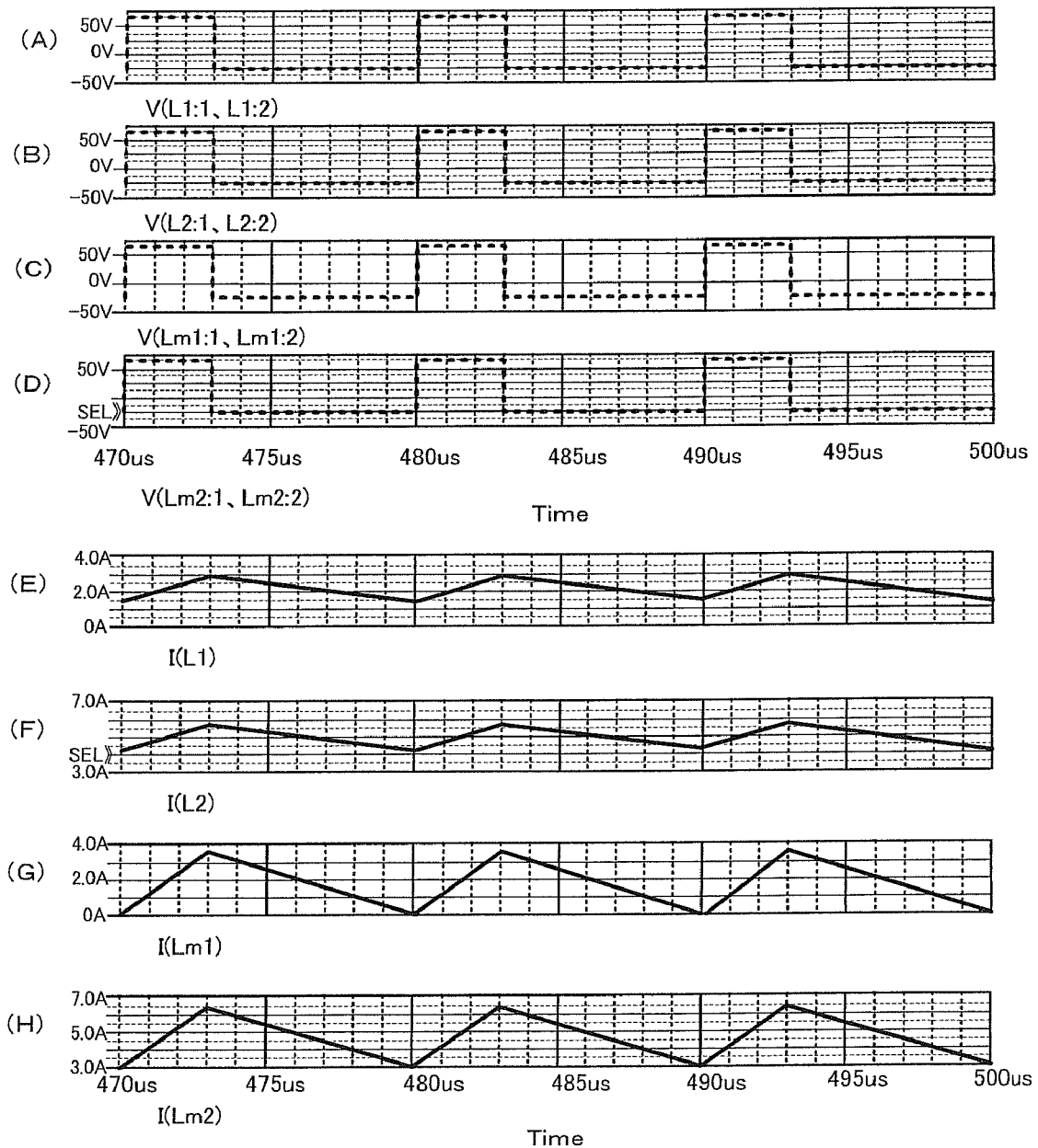
FIG. 7 illustrates operational waveforms of the DC-DC converter as shown in FIG. 1 when the input and output coils have 118 μH inductance, the intermediate coils have 50 μH inductance and there is no magnetic coupling between these coils, wherein (A)-(H) are waveforms corresponding to those in FIG. 5.
Figure 8:
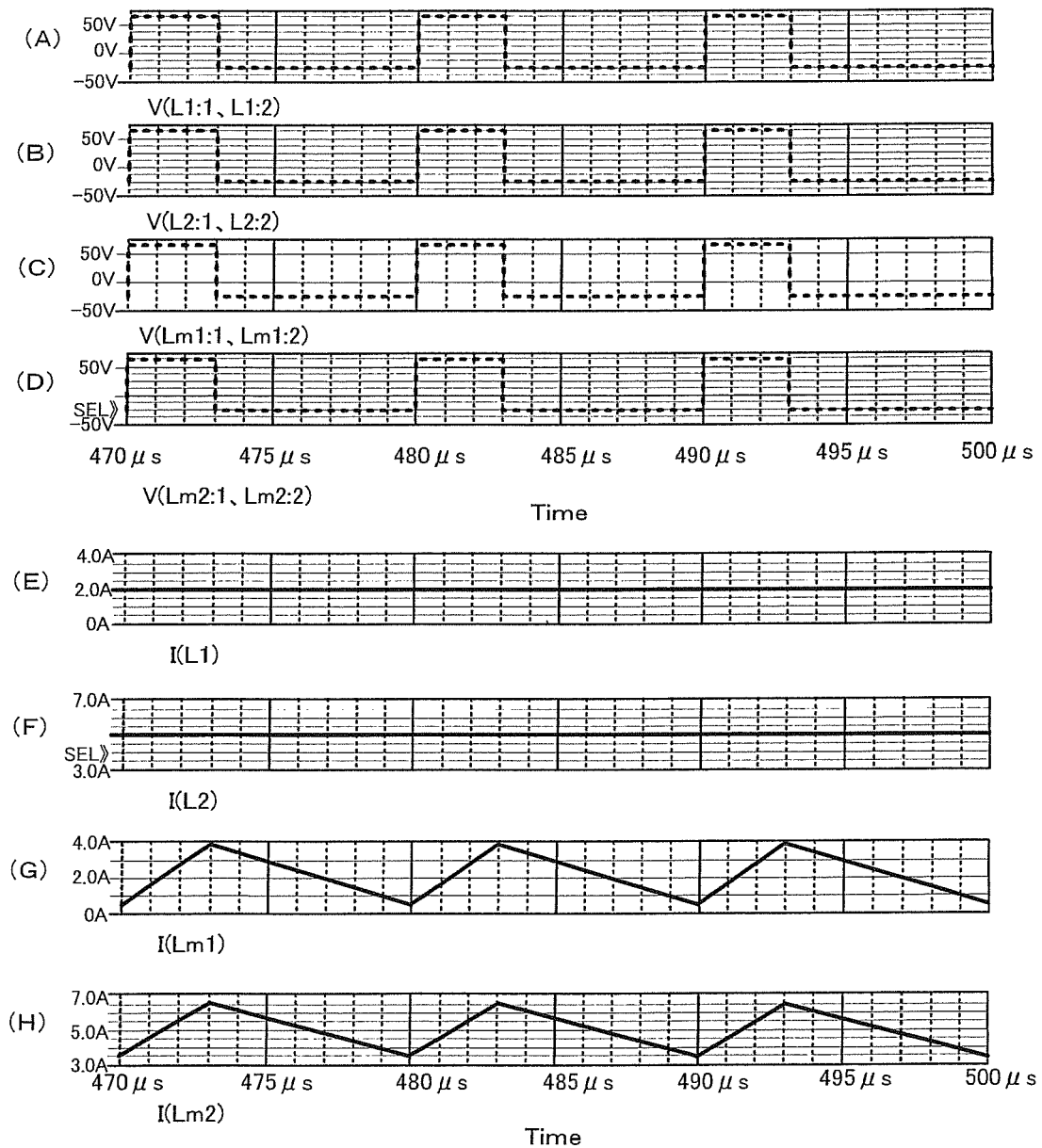
FIG. 8 illustrates operational waveforms of the DC-DC converter as shown in FIG. 1 when the coils have the same inductance as in FIG. 7 and there is magnetic coupling coefficient of k=n=0.65 between the coils, wherein (A)-(H) are waveforms corresponding to those in FIG. 5.

Now, FIGS. 7 and 8 show operation waveforms as a result of simulation of the DC-DC converter 1 according to the present invention under the following conditions for zero rippling the currents through the input and output coils L1 and L2:

| Vi = 120 V | Vo = 50 V |
|---|---|
| L1 = L2 = 118 μH | Lm1 = Lm2 = 50 μH |
| C1 = C2 = 5 μF | Co = 100 μF |
| S = ideal switch | D = ideal diode |
| Switching frequency = 100 kHz | ton = 2.92 μS |

FIG. 7 shows operation waveforms of the DC-DC converter 1 as shown in FIG. 4 when there is no coupling between the coils L1, L2, Lm1 and Lm2. Similar to the operation waveforms in FIGS. 5 and 6(A)-(H), (A)-(D) are the voltage waveforms across these coils, while ((E)-(H) are the ripple current waveforms through these coils. If the voltages across all of these coils L1, L2, Lm1 and Lm2, $Vi/2 \approx 60V$ when the switch S is ON and $-Vo \approx -25V$ when the switch is OFF. These values coincide with the results of the mathematical formulas (2) and (6) that are described hereinabove as the solutions according to the present invention. On the other hand, the ripple currents through the coils L1, L2, Lm1 and lm2 are $\Delta IL1=\Delta IL2=Vi/2/L \times ton \approx 1.5A$ and $\Delta ILm1=\Delta ILm2=Vi/2/L \times ton \approx 3.5A$. These values coincide with the results of the mathematical formulas (4) and (8) that are described hereinabove as the solutions according to the present invention.

FIG. 8 shows operation waveforms of the DC-DC converter 1 as shown in FIG. 4 under the following coupling conditions between the input coil L1—the first intermediate coil Lm1 and the output coil L2—the second intermediate coil Lm2.

winding ratio:

| between L1:Lm1 | $n11 = \sqrt{(Lm1/L1)} = 0.65$ |
|---|---|
| between L2:Lm2 | $n22 = \sqrt{(Lm2/L2)} = 0.65$ | coupling factor:

| between L1:Lm1 | $k11 = n11 = 0.65$ |
|---|---|
| between L2:Lm2 | $k22 = n22 = 0.65$ |

If the voltages across all of the coils L1, L2, Lm1 and Lm2, $Vi/2 \approx 60V$ when the switch S is ON, while $-Vo \approx -25V$ when the switch S is OFF. These values coincide with the results of the mathematical formulas (2) and (6) that are described hereinabove as the solutions according to the present invention. On the other hand, the ripple currents through the coils L1, L2, Lm1 and Lm2 are $\Delta IL1=\Delta IL2 \approx 0A$ (zero ripple) and $\Delta ILm1=\Delta Ilm2=Vi/2/L \times ton \approx 3.5A$. These values coincide with the results of the mathematical formulas (4) and (8) that are described hereinabove as the solutions according to the present invention.

Figure 9:
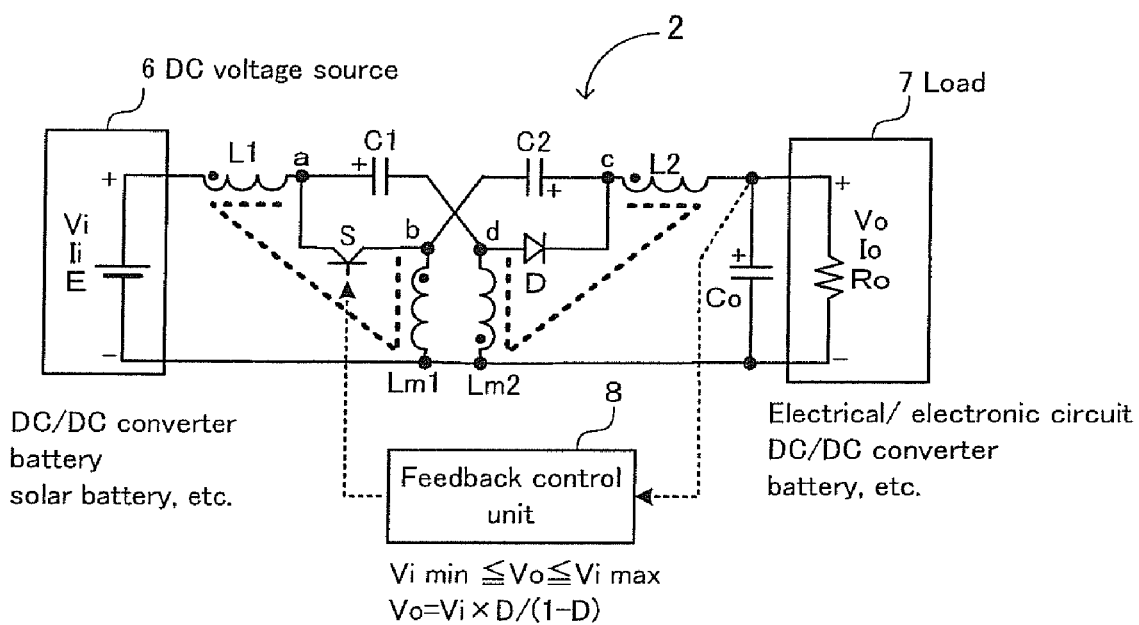
FIG. 9 is the circuit schematic of a second embodiment of the DC-DC converter according to the present invention.

Now, other embodiments or modified embodiments according to the present invention will be described with reference to FIGS. 9-11. FIG. 9 is a circuit schematic of a second embodiment of the DC-DC converter according to the present invention. This DC-DC converter 2 is an example of using a bipolar transistor as the switch S. Since the other constructions remain unchanged from the first embodiment of the DC-DC converter 1 according to the present invention as described hereinabove with reference to FIG. 1 and the like, no duplicated description will be given herein.

Figure 10:
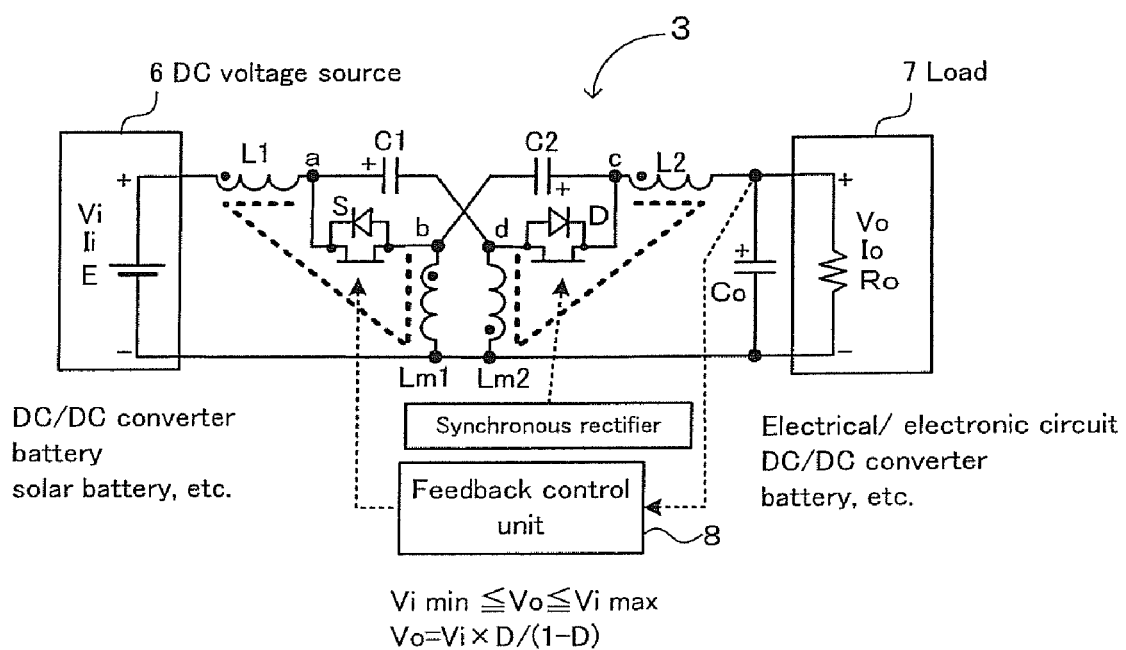
FIG. 10 is the circuit schematic of a third embodiment of the DC-DC converter according to the present invention.

FIG. 10 is the circuit schematic of a third embodiment of the DC-DC converter according to the present invention. This DC-DC converter 3 is an example of using power MOS FETs (MOS type field effect transistors) as the switch S and the diode D. Diodes that are connected in parallel with the power MOS FETs represent parasitic diodes of the power MOS FETs. The ON time of the switch S is controlled by the feedback control section 8 so that the output voltage will be a desired voltage. During the OFF period of the switch S, the power MOS FET that replaces the diode D is turned ON (synchronized rectification), thereby enabling to reduce power loss of the power MOS FET. Since the other circuit configurations remain unchanged, no duplicated operation will be given herein.

Figure 11:
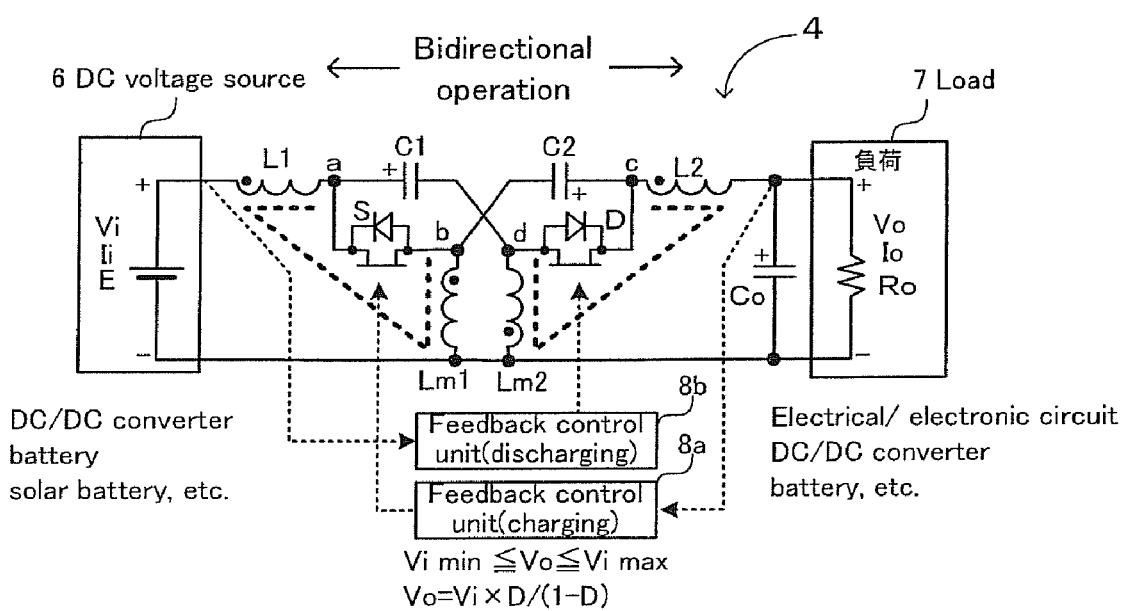
FIG. 11 is the circuit schematic of a fourth embodiment of the DC-DC converter according to the present invention.
Figure 13:
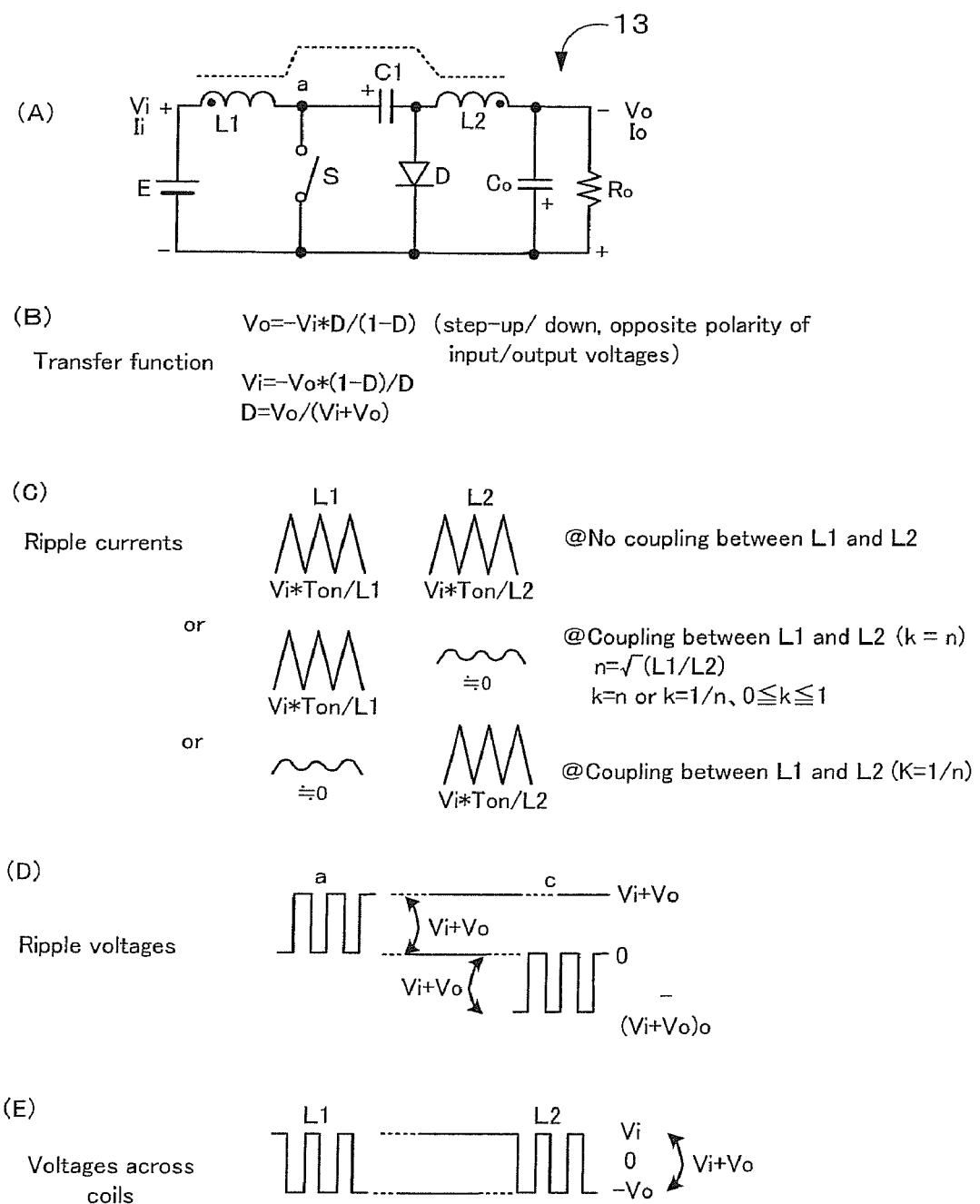
FIG. 13 illustrates a second example of conventional DC-DC converters, wherein (A) is the circuit schematic, (B) is a transfer function, (C) is ripple currents, (D) is a ripple voltage and (E) is a coil voltage.
Figure 14:
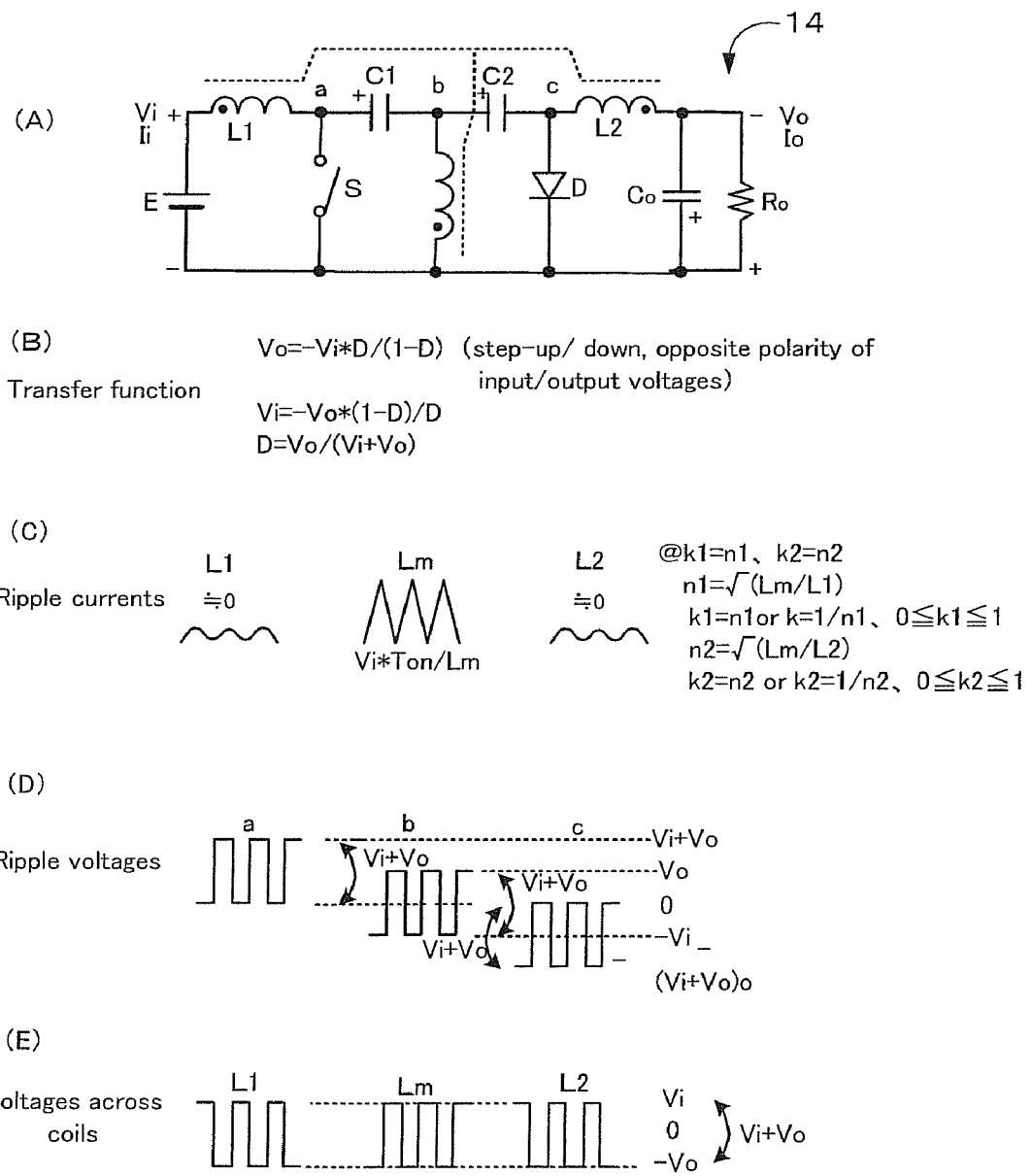
FIG. 14 illustrates a third example of conventional DC-DC converters, wherein (A) is the circuit schematic, (B) is a transfer function, (C) is ripple currents, (D) is a ripple voltage and (E) is a coil voltage.

Now, FIG. 11 shows the circuit schematic of a fourth embodiment of the DC-DC converter according to the present invention. The basic circuit configuration of this DC-DC converter 4 is the same as the DC-DC converter 3 as shown in FIG. 10. However, a close look at this DC-DC converter 4 proves a symmetrical configuration at the left and right sides, or the input-output sides. It has been described hereinabove that the DC-DC converter operates as the step-up/down converter with the left and right sides acting respectively as the input and output sides by controlling the ON time of the switch S. Because of the symmetrical configuration, it can be operated as a step-up/down converter with the right and left sides acting as the input and output sides when controlling the ON time of the power MOS FET used as a replacement of the diode D. In other words, this DC-DC converter 4 can also be operated as a bi-directional step-up/down converter. A DC power supply bus having the DC voltage source 6 at the left side and the load 7 is able to stepping up/down charge a battery connected to the right side. It is also possible to stepping up/down discharge from a battery at the left side to the DC power supply bus at the right side. This means that the single DC-DC converter 4 is able to perform both of a charging control 8a and a discharging control 8b, thereby reducing the size of a charger/discharger. Also, the battery voltage to be used can vary over a wide range with respect to the voltage of the DC power supply bus because of the stepping up/down converter, thereby enabling to improve freedom of selecting the number of series connected battery cells (such as solar panels or the like). It is possible to adjust battery electric energy (Wh) not only by the capacity (Ah) of a cell but also by the number of series connected cells. The DC-DC converter is advantageous in a case where the available cell capacity is limited to discrete value.

Preferred embodiments of the DC-DC converter according to the present invention have been described in detail hereinabove. It is to be noted, however, that such embodiments are nothing but mere examples of the present invention and should not interpreted to restrict the scope of the present invention. A person having an ordinary skill in the art easily understands that various modifications and alternations can be made to fit particular applications without departing the scope and spirit of the present invention.

The DC-DC converter according to the present invention and having the particular construction as described hereinabove finds special applications to a power supply system and equipment utilizing solar panels or batteries as a power source, a battery charging/discharging system and equipment, or a power supply system and equipment requiring a low noise performance.

What is claimed is:

1. A DC-DC converter of non-isolation configuration for outputting a non-inverted output voltage of a desired value by stepping up/down a voltage of an input voltage source, comprising:
    an input coil, an input capacitor and a second intermediate coil connected in series between both ends of the input voltage source;
    an output coil, a output capacitor and a first intermediate coil connected in serried between both ends of a load;
    a switching device connected between a junction of the input coil and the input capacitor and a junction of the first intermediate coil and the output coil; and
    a diode connected between a junction of the input capacitor and the second intermediate coil and a junction of the output capacitor and the output coil.

2. A DC-DC converter of claim 1, wherein the input output coils and the intermediate coils are magnetically coupled in such a manner to reduce ripple currents through the input output coils.

3. A DC-DC converter of claim 1, wherein the switching device comprises a transistor that is controlled by feedback control means to which the output voltage across the load is supplied.

4. A DC-DC converter of claim 1, wherein the switching device and the diode comprise power MOS transistors.

5. A DC-DC converter of claim 1, wherein the switching device and the diode comprise power MOS transistors that are controlled by feedback control sections to which the output voltage and the voltage of the input voltage source are supplied as inputs, respectively.

6. A DC-DC converter of claim 1, wherein the input voltage source comprises a solar panel having a plurality of cells connected in series with one another.

7. A DC-DC converter for supplying an output voltage across a load by stepping-up/down the voltage of an input voltage source with the output voltage and the input voltage being the same polarity to each other, comprising:
    a first coil L1, a first capacitor C1, a diode D and a second coil L2 connected in series between one end of the input voltage source E and one end of the load Ro;
    a switch S and a second capacitor C2 connected in series between a node a of the first coil L1 and the first capacitor C1 and a node c of the diode D and the second coil L2;
    a third coil Lm1 connected between a node b of the switch and the second capacitor C2 and the other ends of the input voltage source E and the load Ro; and
    a fourth coil Lm2 connected between a node d of the first capacitor C1 and the diode D and the other ends of the input voltage source E and the load Ro;
    wherein the ON/OFF time of the switch S is controlled to adjust the output voltage and the first to fourth coils L1-Lm2 are magnetically coupled to reduce ripple currents through the first coil L1 and the second coil L2.

8. A DC-DC converter of claim 7, wherein the input voltage source E is solar battery cells to provide the voltage varying over a wide range and the load is electronic circuits installed in an artificial satellite.

9. A DC-DC converter disposed symmetrically between an input voltage source and a load for supplying across the load a non-inverted output voltage of any desired value, comprising:
    a first series connection path of a pair of coils and a capacitor intermediate the pair of coils connected between both ends of the input voltage source;
    a second series connection path of a pair of coils and a capacitor intermediate the pair of coils connected between the both ends of the load;
    a pair of semiconductor devices connected across the capacitors in the first and second series connection paths in a crossing relationship; and
    a pair of feedback control circuits for respectively controlling the semiconductor devices in response to the output and input voltages.

10. A DC-DC converter of claim 9, wherein the coils in the first and second series connection paths are magnetically coupled for reducing ripple currents through the coils.

* * * * *